United States Patent

[11] 3,590,562

| [72] | Inventors | Thomas W. Byers;<br>Richard D. Rivers, both of Louisville, Ky. |
|---|---|---|
| [21] | Appl. No. | 797,146 |
| [22] | Filed | Feb. 6, 1969 |
| [45] | Patented | July 6, 1971 |
| [73] | Assignee | American Air Filter Company, Inc.<br>Louisville, Ky. |

[54] FILTER CELL AND MOUNTING FRAME ASSEMBLY
3 Claims, 4 Drawing Figs.

[52] U.S. Cl. ................................................. 55/484
[51] Int. Cl. ................................................. B01d 25/22
[50] Field of Search............................................55/387, 490, 478—481, 482—484, 502, 504, 515, 517; 210/324, 325, 330, 339; 34/192, 194, 193, 195, 196, 197, 237, 238

[56] References Cited
UNITED STATES PATENTS

| 2,062,649 | 12/1936 | Hegan | 55/DIG. 31 |
| 2,774,443 | 12/1956 | Slayter | 55/DIG. 31 |
| 160,093 | 2/1875 | Grube | 55/481 |
| 1,899,029 | 2/1933 | Gagen | 55/505 |
| 2,016,033 | 10/1935 | Christofferson | 55/500 |
| 3,111,489 | 11/1963 | Getzin | 55/517 |

OTHER REFERENCES

" Recent Progress in Dust Collecting Equipment" in SHEET METAL WORKER pages 24, 25 & 38 June 1940 (A copy in 55- 478)

Primary Examiner—Frank W. Lutter
Assistant Examiner—Bernard Nozick
Attorneys—Ralph B. Brick and Edward M. Steutermann ABSTRACT: A filter cell and mounting frame assembly including a modular support frame having a plurality of flow-through side-by-side spaced passages separated by strip members, certain portions of which separator strip members are comparatively more flexible than other portions, the support frame passages receiving filter cells, the peripheral end walls of which cells engage with the separator strip members in fast sealed relation therewith, the strip members being sufficiently flexible to accommodate for possible distortions.

PATENTED JUL 6 1971 3,590,562

INVENTORS
Richard D. Rivers
Thomas W. Byers
BY Ralph B. Brick
ATTORNEY

FILTER CELL AND MOUNTING FRAME ASSEMBLY

BACKGROUND OF THE INVENTION

The present invention pertains to an improved apparatus for gas separation, and more particularly, to a new, useful, and unobvious arrangement for mounting a plurality of filter cells in fast, sealed uninterrupted engagement with flow-through passages in a modular support frame.

Various types of filter cell mounting arrangements are known in the art of gas filtration to secure filter cells in sealed relationship to a plurality of passages in support frame structures. For the most part, these past arrangements have proven to be complex and expensive in construction and maintenance and even after the cells have been mounted, have presented problems in leakage in the areas where the cells engage the support frame.

SUMMARY OF THE INVENTION

The present invention, recognizing that these past mounting arrangements have been difficult in construction and maintenance and have presented leakage problems, provides a filter cell and mounting frame assembly which is straightforward and economical in both construction and operation, allowing quick installation and removal of filter cells with minimum gas stream leakage and maximum access of the cells or installation and removal. At the same time, the present invention provides an arrangement which allows accurate alignment of the filter cells and the support thereof, permitting proper passage of a gas stream through the cells.

Various other features of the present invention will become obvious to one skilled in the art upon reading the disclosure set forth herein.

More particularly, the present invention provides an improved gas filter structure assembly comprising: a plurality of filter cells each having a gas flow-through frame including a dirty gas inlet and clean gas outlet passage, the frame being of substantially rectangular overall configuration to include at least one pair of opposed sidewalls with filter medium extending therebetween through which a gas stream is passed to be filtered, the frame further being provided with at least one peripheral end wall member defining one of the gas passages through which the gas stream passes; and a modular support frame including a peripheral, smooth and uninterrupted planar face wall for the filter cells, the support frame having a plurality of flow-through side-by-side spaced passages therein, each defined by the support frame face wall, the spaced passages of the support frame being separated by longitudinally extending separator strip members each having integral side flanges longitudinally extending normal therefrom along a major portion of the strip with selected portions of the strip being free of such flanges whereby such free portions are comparatively more flexible than the flanged portions, each of the passages in the support frame receiving the gas passage of a filter cell defined by the peripheral end wall member thereof, the end wall member engaging in fast sealed relation against the strip member, with the strip member being sufficiently flexible at its free portions to accommodate for possible distortions.

It is to be understood that various changes can be made in the several parts of the structure disclosed herein without departing from the scope or spirit of the present invention.

Referring to the drawing which discloses one advantageous embodiment of the present invention:

Figure 4:
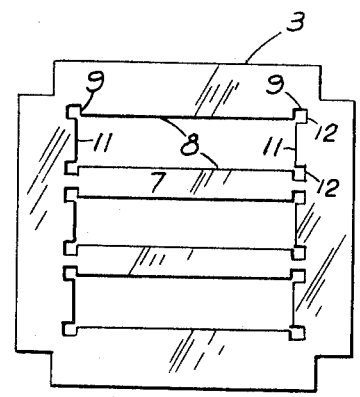
FIG. 4 is a reduced plan view of a novel modular support frame before erection.

As can be seen in the drawing, the novel invention is arranged for mounting in a rectangular flow-through frame housing 2 which can be sized to accommodate any one of a number of several arrangements of modular support frames in side-by-side relationship. Each of modular support frames 3 integrally includes a peripheral, smooth and uninterrupted planar face wall 4 having a plurality of flow-through side-by-side spaced passages 6 therein. Frame 3 is so designed that passages 6 are separated by longitudinally extending separator strip members 7. Each strip 7 includes integral side flanges 8 longitudinally extending normal therefrom along the major portion thereof with opposed end portions 9 of the strip being free of such flanges. As can be readily seen in FIG. 4, modular support frame 3 advantageously is stamped from an integral flat sheet of thin light gauge metal and bent to provide the necessary side flange portions 8 as aforedescribed. It is also to be noted that passages 6 advantageously can be provided with side flanges 11 similar to flanges 8 previously described to provide for end portions 12.

Figure 1:
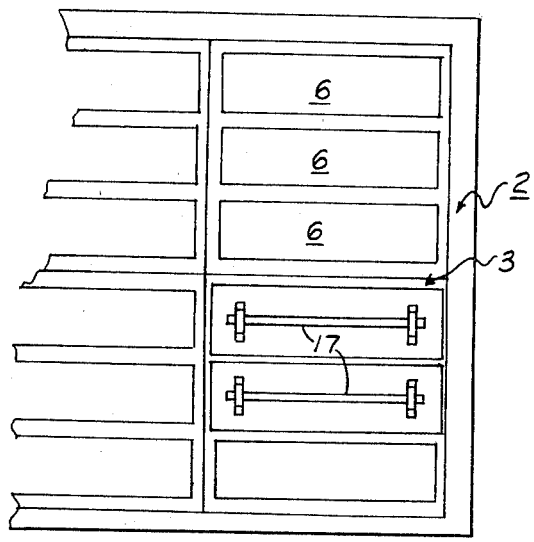
FIG. 1 is a front end elevational view of a portion of the novel filter cell and support frame assembly.
Figure 2:
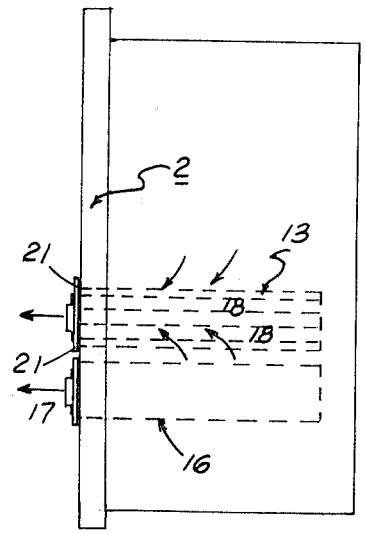
FIG. 2 is a side view of the assembly of FIG. 1.

Adapted to be mounted in receiving engagement with passages 6 of modular support frames 3 are a plurality of filter cells 13, each having a gas flow frame broadly designated by reference numeral 14. As disclosed in FIGS. 2 and 3, each frame includes dirty as inlet 16 and clean gas outlet 17, the frame being of substantially rectangular configuration in its overall form to include at least one pair of opposed sidewalls 18 with filter medium 19 extending therebetween through which a gas stream is passed to be filtered. The frame, as disclosed, is provided with at least one peripheral end wall member 21 defining one of the gas passages 17 through which the gas stream passes during treatment. In the embodiment disclosed, filter cell 13 is disposed to extend through spaced passages 6 of support frame 3, integral side flanges 8 and 11 serving as guide and support members.

Figure 3:
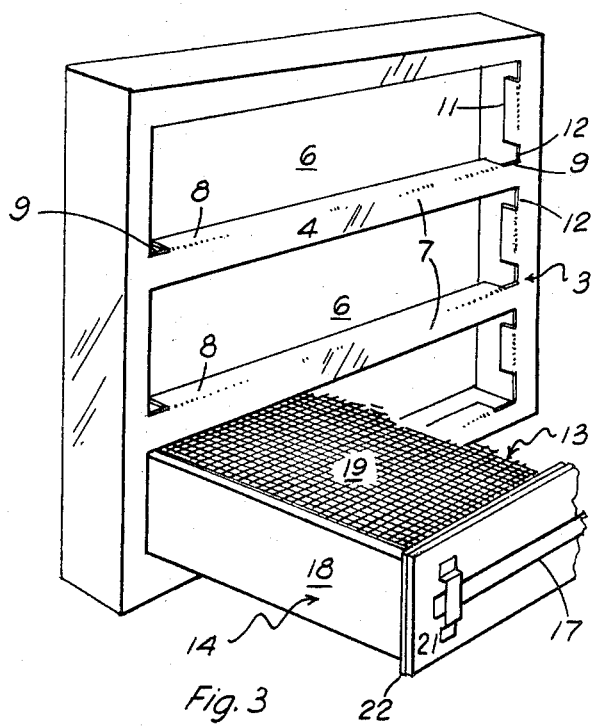
FIG. 3 is an exploded view of the assembly of FIGS. 1 and 2 disclosing a portion of a filter cell in extended position for mounting within the support frame.

As can be noted in FIG. 3, peripheral end wall member 21 of each cell is of greater size than passage 6 with which it cooperates so that when filter cell 13 is in position, wall 21 abuts against the planar front face wall 4 of frame 3 in sealed relation therewith. In this connection, it also is to be noted that a suitable gasket member 22 can be provided to insure more thorough sealing between the peripheral wall member 21 and the face wall 4 of support frame 3. In view of the fact that support frame separator strips 7 are provided with opposed free end portions, sufficient flexibility is provided to permit and accommodate for any distortions between the peripheral end wall 21 and the support frame to insure a more thorough sealing between the frame and the filter cells.

It is to be understood that suitable fastening devices can be used to hold the peripheral end wall member 21 of cells 13 in fast engagement with the face wall of the support frame against which it abuts. It also is to be understood that the present invention is not to be considered as limited to the construction disclosed. For example, if desired, the peripheral end walls of the filter cells can be arranged to abut against the planar face wall 4 defining the passage of the support frame with the cells extending outwardly therefrom in cantilever fashion from the support frame rather than through the passages, suitable locking devices being used to hold the filter cells in such cantilevered position.

The invention we claim is:

1. An improved gas filter structure assembly comprising: a plurality of filter cells, each having a gas flow-through frame including a dirty gas inlet and clean gas outlet passage, said frame being of substantially rectangular overall configuration to include at least one pair of opposed sidewalls with filter medium extending therebetween through which a gas stream is passed to be filtered, said frame being provided with at least one peripheral end wall member defining one of said gas passages through which said gas stream passes; and an integral modular support frame for said filter cells including sidewalls and a peripheral, smooth and uninterrupted, planar front face wall having a plurality of flow-through side-by-side spaced passages therein, each defined by the support frame face wall, said spaced passages of said support frame being separated by longitudinally extending separator strip members each strip member having integral side flanges longitudinally extending in normal fashion from opposed sides of said strip members along the major portion thereof with preselected portions of said strip member having opposed sides completely free of such flanges whereby said preselected portions free of flanges are comparatively more flexible than said flanged portion, each of said passages in said support frame receiving one of the said gas passages of said filter cells defined by said peripheral end wall member, said end wall member engaging in fast sealed relation against said strip members with said strip members being sufficiently flexible at its free portions to accommodate for possible distortion and the preselected portions of each strip member being on opposite ends of the side flanges.

2. The apparatus of claim 1, said filter cells being disposed to extend through said spaced passages of said support frame, said integral side flanges of said strip members serving as guide and support members, said peripheral end wall members of each cell being of greater size than the passage with which it cooperates to abut against said planar front face wall of said support frame in sealed elation therewith.

3. The apparatus of claim 1, the preselected portions of each strip member with opposed sides free of flanges being positioned at opposite ends of said strip with the integral side flange portions extending therebetween.